H. E. COFFIN.
VEHICLE ASSEMBLY STAND.
APPLICATION FILED APR. 13, 1908.

1,001,619.

Patented Aug. 29, 1911.
2 SHEETS—SHEET 1.

Witnesses
W. C. Ford
James O. Barry

Inventor
Howard E. Coffin
By Whittemore, Hulbert & Whittemore
att'ys

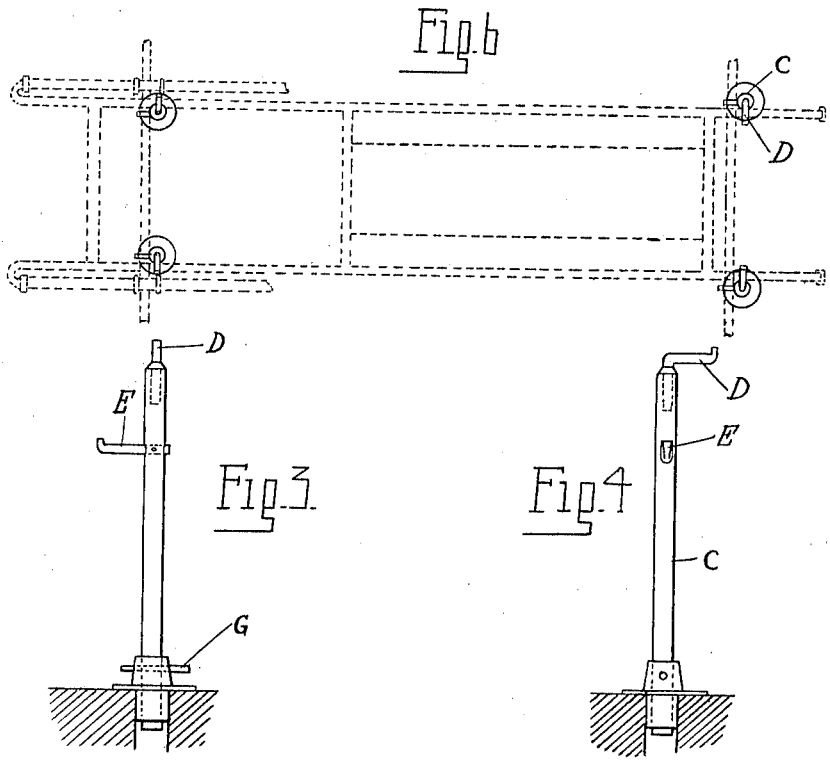
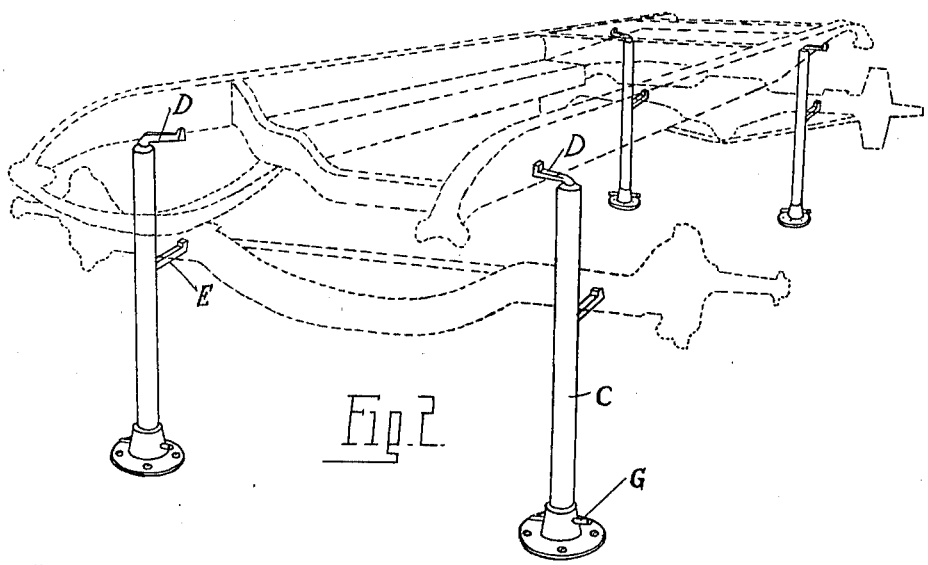

UNITED STATES PATENT OFFICE.

HOWARD E. COFFIN, OF DETROIT, MICHIGAN.

VEHICLE ASSEMBLY-STAND.

1,001,619.  Specification of Letters Patent.  Patented Aug. 29, 1911.

Application filed April 13, 1908. Serial No. 426,756.

*To all whom it may concern:*

Be it known that I, HOWARD E. COFFIN, a citizen of the United States of America, residing at Detroit, in the county of Wayne and State of Michigan, have invented certain new and useful Improvements in Vehicle Assembly-Stands, of which the following is a specification, reference being had therein to the accompanying drawings.

It is the object of the invention to economize floor space and to otherwise facilitate the work of assembling motor vehicles, and to this end the invention consists in the construction as hereinafter set forth.

Figure 5:
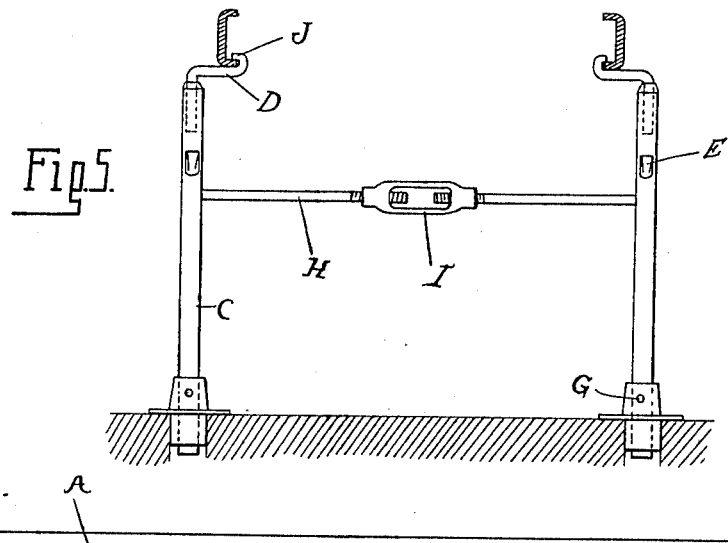
Figure 1:
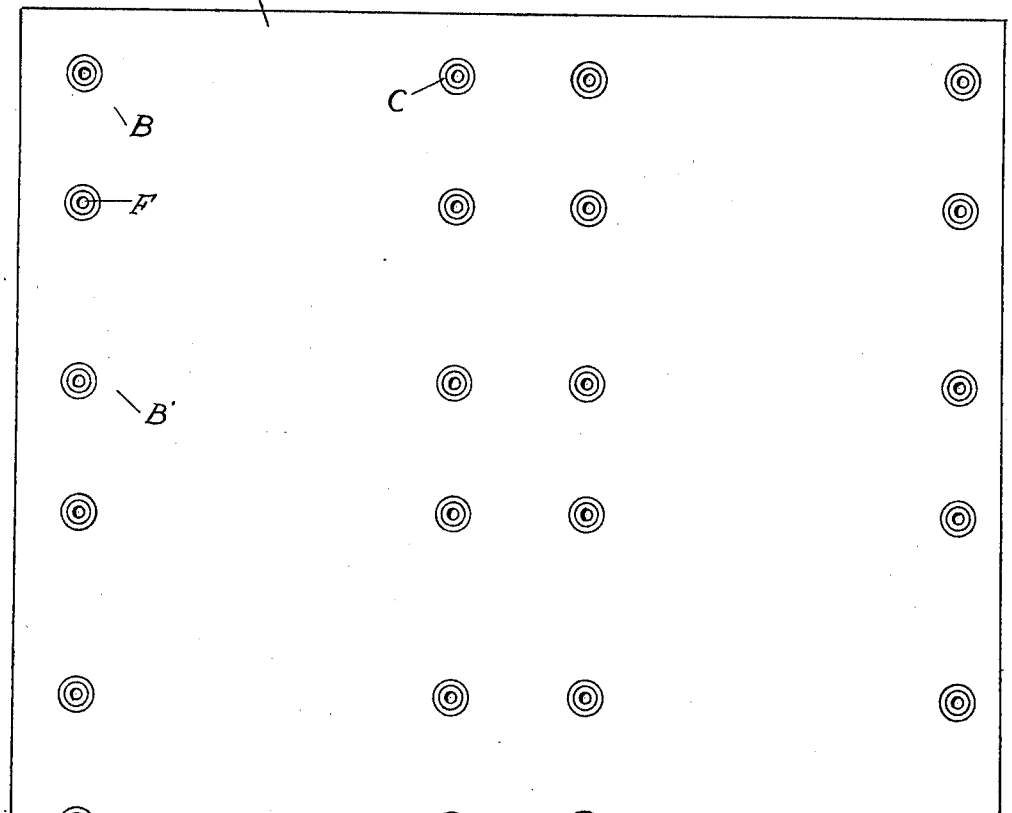

In the drawings—Figure 1 is a plan view of the assembling floor; Fig. 2 is a perspective view of one of the assembling stands with the frame of a vehicle supported thereon indicated in dotted lines; Figs. 3 and 4 are respectively a side elevation and end elevation of the vertically adjustable standards constituting the stand; Fig. 5 is a cross section illustrating a vehicle frame clamped to the stand for riveting; and Fig. 6 is a plan view of one of the stands, showing the chassis in dotted lines as mounted thereon.

It is usual in assembling the parts of a motor vehicle to first support the side sills in reverse position upon a pair of horses and then to attach to these sills the cross bars of the frame, the springs, axles, and other parts of the chassis. It is then necessary to lift the assembled structure and reverse it before further work thereon may be performed. This method of procedure requires sufficient floor space for each assembly to permit of removing the same from the horses and reversing, and furthermore as there is nothing to define or limit the space occupied by each individual assembly the various workmen on the floor are continually interfering with each other.

With my improvement the assembly floor is unobstructed with horses or other like supports. The position to be occupied by each individual assembly is exactly predetermined and limited and all the parts assembled are arranged from the start in their normal upright position so that when the chassis is completed no reversal is necessary.

A further feature of the invention is that assembly stands are provided which are adapted to both support and position the various parts of the assembly in proper relation to each other. Still further these stands are so constructed that they may be lowered to support the chassis upon its wheels and permit it to be rolled away thereon.

Another advantage is that the stands are formed merely of a plurality of upright posts, having work supporting arms thereon, and detachable engaging sockets in the floor. Thus at any time the floor or any portion thereof may be quickly cleared by disengaging these posts from the sockets.

As illustrated, A is the assembly floor upon which a series of assembly stands B B', etc., are arranged, the individual stands being arranged in predetermined relation to each other. Each of these stands preferably comprises four independent posts C, and these are so positioned as to be adjacent to the intersection of the planes of the side sills and the axles. Each post is provided with one or more supporting arms preferably an arm D extending laterally from the upper end of the post and an arm E projecting in a plane at right angles to that of the arm D and from a lower point in the post. The arms D form the supports for the sills of the frame and the arms E the supports for the axles, and these are so relatively positioned that the springs or other connecting members between the said parts may be attached thereto. The height of the supporting arms is such that when the wheels are placed on the axles they will slightly clear the floor.

Each of the posts C is positioned by engagement with a socket member F preferably a casing secured to the floor. The post slidably engages this socket, but is held in normal position by suitable locking means such as the pin G which passes through registering apertures in the socket and post and holds the latter both from vertical and rotary movement. When, however, the pin G is withdrawn the post C may be lowered, and this will drop the arms D and E sufficiently to disengage them from the parts of the frame and permit the chassis to be supported upon its own wheels.

With the construction as thus far described in use the posts C of the various stands are first raised and locked in position by their pins G. The various parts are then assembled upon the stand preferably by first engaging the axles with the arms E and placing the sills in engagement with the arms D, and then positioning and connecting the other parts of the frame. When the assembly is complete the pins G are withdrawn, the posts C lowered and the chassis is run away upon its own wheels. The stand B may also be employed for clamping the frame to permit of riveting the parts thereof. For this purpose the pair of posts arranged in the same transverse plane are cross connected by a strut member H which is adjustable in length, as by forming it in two sections connected by a central turnbuckle I. The arms D are provided with hooked jaw members J for engaging one flange of the side sills and the arrangement is such that by adjusting the turnbuckle I the opposite post C may be spread apart causing the jaws J to tightly clamp the sills of the frame. This will give sufficient rigidity to the structure to permit of the riveting operation and after the completion of the work an adjustment of the turnbuckle will release the clamp and permit the frame to be disengaged.

What I claim as my invention is:

1. An assembly stand comprising a pair of posts rigidly secured at their lower ends in predetermined relation, bearings at the upper ends of said posts for engaging and supporting the members of the structure, a cross strut between said posts intermediate their ends, and means for adjusting the length of said strut to slightly flex said posts and clamp the work.

2. An assembly stand comprising a pair of posts fixedly positioned at their lower ends, hooked bearings on said posts for supporting the opposite sides of the frame to be assembled and having hooks for engaging said sides, and a cross connecting strut having a turnbuckle therein for relatively moving said posts to cause said hooked bearings to clamp the frame.

3. A vehicle assembling support comprising means for supporting the axles and the main elements of the frame separately and in normal upright predetermined relation and relative position, and means for lowering the support for disengagement from the assembled structure and to rest the latter upon its wheels to permit of removal thereon.

4. A vehicle assembling support comprising a vertically extending member, arms projecting laterally from said member in transverse planes and adapted for respectively supporting an axle and a frame member in normal relation and for engaging the same adjacent to the intersection of their vertical planes.

5. A vehicle assembling support comprising means for independently supporting the main elements of the frame and the axles in normal upright relation and in a position where the wheels will clear the floor, said means consisting of a plurality of vertically adjustable posts positioned to be adjacent to the intersections of the vertical planes of the axles and side sills of the frame, and arms projecting laterally from said posts in transverse planes.

6. A vehicle assembling support comprising means for independently supporting the main elements of the frame and the axles in normal upright relation and in a position where the wheels will clear the floor, said means consisting of a plurality of vertically adjustable posts positioned to be adjacent to the intersections of the vertical planes of the axles and side sills of the frame, and arms projecting from said posts for engaging said sills and axles.

In testimony whereof I affix my signature in presence of two witnesses.

HOWARD E. COFFIN.

Witnesses:
 NELLIE KINSELLA,
 JAMES P. BARRY.

Copies of this patent may be obtained for five cents each, by addressing the "Commissioner of Patents, Washington, D. C."